United States Patent
Ritz et al.

(10) Patent No.: US 7,154,559 B2
(45) Date of Patent: Dec. 26, 2006

(54) VIDEO APPARATUS, NOTABLY VIDEO DECODER, AND PROCESS FOR MEMORY CONTROL IN SUCH AN APPARATUS

(75) Inventors: Edouard Ritz, Sèvres (FR); Daniel Creusot, Voisins le Bretonneux (FR); Daniel Faye, Meulan (FR)

(73) Assignee: Thomson Licensing, Boulogne (FR)

( * ) Notice: Subject to any disclaimer, the term of this patent is extended or adjusted under 35 U.S.C. 154(b) by 528 days.

(21) Appl. No.: 10/083,011

(22) Filed: Feb. 25, 2002

(65) Prior Publication Data

US 2002/0126225 A1   Sep. 12, 2002

(30) Foreign Application Priority Data

Mar. 9, 2001   (FR)   ................... 01 400628

(51) Int. Cl.
*H04N 7/26*   (2006.01)
(52) U.S. Cl. ...................... 348/569; 710/263
(58) Field of Classification Search ............... 348/569, 348/565, 566, 567; 710/263, 266, 268
See application file for complete search history.

(56) References Cited

U.S. PATENT DOCUMENTS

| | | | | |
|---|---|---|---|---|
| 5,608,459 A | * | 3/1997 | Hashimoto et al. | 375/240.15 |
| 5,898,695 A | * | 4/1999 | Fujii et al. | 370/464 |
| 6,085,278 A | * | 7/2000 | Gates et al. | 710/263 |
| 6,137,539 A | * | 10/2000 | Lownes et al. | 348/569 |
| 6,226,291 B1 | * | 5/2001 | Chauvel et al. | 370/392 |
| 6,263,396 B1 | * | 7/2001 | Cottle et al. | 710/263 |
| 6,462,746 B1 | * | 10/2002 | Min et al. | 345/545 |
| 6,774,918 B1 | * | 8/2004 | Muth | 345/716 |
| 2005/0094978 A1 | * | 5/2005 | Kikuchi et al. | 386/95 |

FOREIGN PATENT DOCUMENTS

| | | | |
|---|---|---|---|
| EP | 0735776 | | 10/1996 |
| EP | 0840512 | | 5/1998 |
| JP | 02003174627 A | * | 12/2001 |
| WO | WO99/66720 | | 12/1999 |

OTHER PUBLICATIONS

Anderson R. et al. "Integrating the MPEG-2 subsystem for digital television" IBM Journal of Research and Development, vol. 42, No. 6, Nov. 6, 1998, pp. 795-805, XP000952033.
Patent Absracts of Japan, vol. 1999, No. 09, Jul. 30, 1999 & JP 11 103429 of Apr. 13,1999.
European Search Report of Aug. 2, 2001.

* cited by examiner

*Primary Examiner*—Paulos M. Natnael
(74) *Attorney, Agent, or Firm*—Joseph J. Laks; Robert D. Shedd; Catherine A. Ferguson

(57) ABSTRACT

A video apparatus has a digital decoder having a first memory on an internal bus and linked to an OSD circuit and to a second memory via a main bus.

The video apparatus comprises means for realizing a DMA transfer between the first memory and the second memory.

A process for controlling such a video apparatus is also described.

10 Claims, 1 Drawing Sheet

VIDEO APPARATUS, NOTABLY VIDEO DECODER, AND PROCESS FOR MEMORY CONTROL IN SUCH AN APPARATUS

FIELD OF THE INVENTION

The invention relates to a video apparatus, notably a video decoder, and to a process for controlling such an apparatus.

BACKGROUND OF THE INVENTION

It is known to provide a video apparatus with a decoder circuit, for instance a MPEG decoder, in order to generate a video signal usable by a display, for instance as a CVBS signal or as a RGB signals, from a video digital stream. Such a decoder circuit uses a so-called Video RAM (random-access-memory) to retain data which are processed, for instance to decompress a MPEG stream.

Generally, a video apparatus also comprises an OSD circuit (OSD stands for On-Screen Display) to generate and send to the display images to be superimposed on the video sequence output by the decoder circuit; these images are often menus with graphics.

The OSD circuit also needs RAM to generate and process the graphics, i.e. the OSD images.

SUMMARY OF THE INVENTION

The invention seeks to provide a video apparatus with a decoder circuit and an OSD circuit with memory architecture with reduced memory size and thus also proposes a process to control this memory architecture according to the mode of operation of the video apparatus.

The invention proposes a video apparatus with a digital decoder having a first memory on an internal bus and linked to an OSD circuit and to a second memory via a main bus, the video apparatus comprising means for realising a DMA transfer between the first memory and the second memory.

Preferably, a CPU is connected to the main bus and the second memory is used by the CPU. Possibly the first memory is a Video RAM and wherein the second memory is a CPU RAM.

In a possible embodiment, the digital decoder is connected to a digital front-end.

The invention also proposes a process for controlling a video apparatus with a digital decoder having a first memory on an internal bus and linked to an OSD circuit and to a second memory via a main bus, comprising the step of realising a DMA transfer between the first memory and the second memory via the digital decoder.

The following steps are proposed:
issuing a request for the OSD circuit to use more than a given size in the second memory,
realising a DMA transfer from the second memory to the first memory The following further steps are also possible:
issuing a request for the OSD circuit to use data in the first memory,
copying via a DMA transfer data from the second memory to the first memory;
realising a DMA transfer of the requested data from the first memory to the second memory.

BRIEF DESCRIPTION OF THE DRAWINGS

The invention will now be explained with reference to FIG. 1 representing a video apparatus according to the invention. The video apparatus of FIG. 1 is a satellite decoder 2. Only the parts which are necessary for understanding the invention have been represented.

DETAILED DESCRIPTION OF A PREFERRED EMBODIMENT

Figure 1:
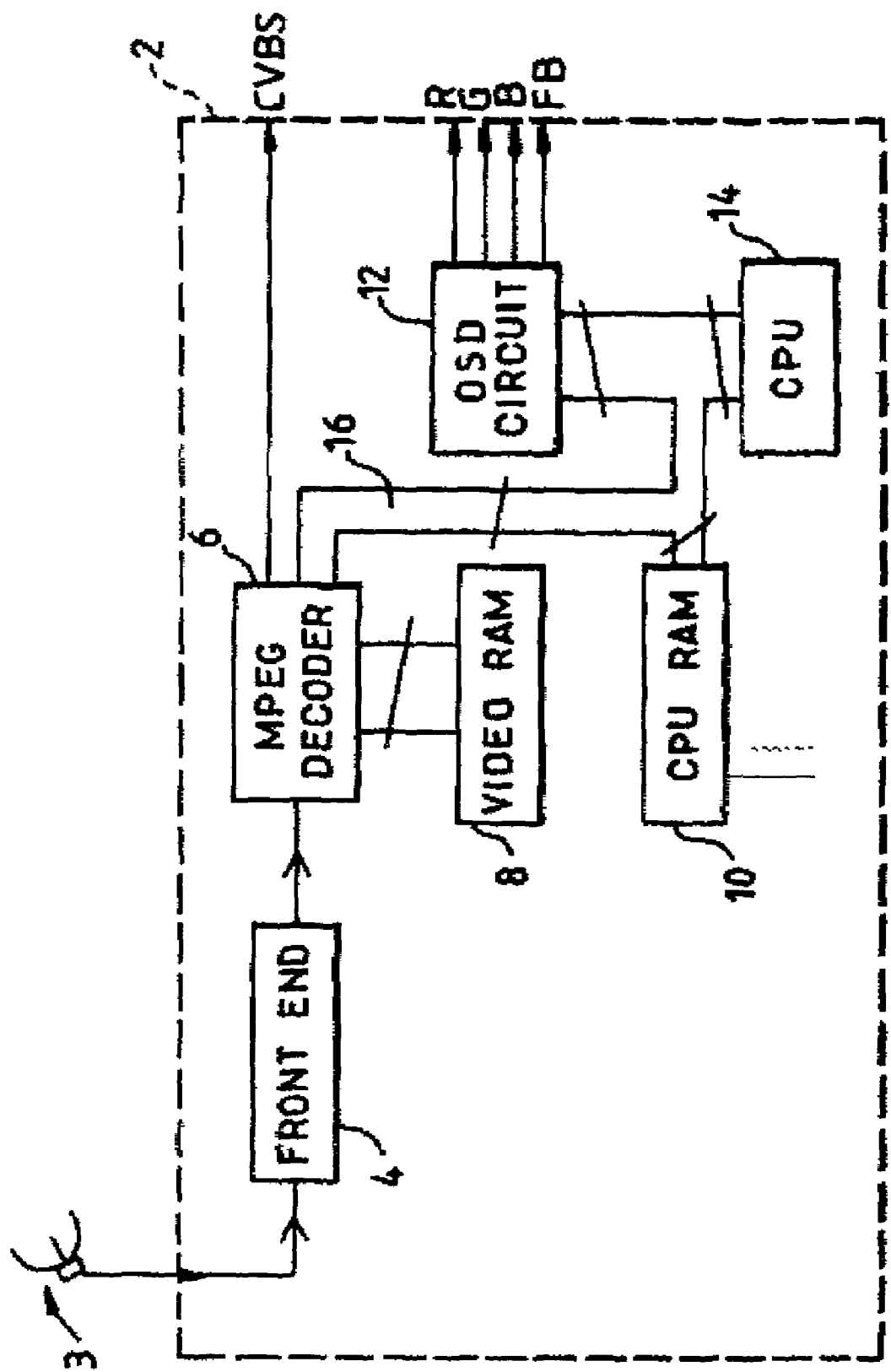

An antenna 3 receives a signal representing at least one video sequence from a satellite. An input pin of the decoder 2 receives the signal transmitted by the antenna 3 to forward it to a digital front-end 4 comprising notably a tuner and a demodulator. From the antenna signal, the digital front-end generates a MPEG stream which is converted to a CVBS signal by a MPEG decoder 6. To decompress the MPEG stream, the MPEG decoder 6 is connected via a data bus to a video RAM 8.

On the other hand, the satellite decoder 2 also has an OSD circuit 12 for generating, upon instructions from a CPU 14, images (called graphics hereafter) to be superimposed on the CVBS signal. The graphics to be displayed are coded in RGB on a Scart connector with a fast blanking signal FB indicating when points of the graphics have to be displayed.

The CPU 14 and the OSD circuit 12 share a RAM, called CPU RAM 10, via a common data bus 16. The MPEG decoder 6 is also connected on this common bus 16.

The Video RAM 8 and the CPU RAM 10 can exchange data on the common bus 16 through the MPEG decoder 6 by DMA (DMA stands for Direct Memory Access). It should be noted however that the Video RAM 8 is not directly accessible from the CPU 14.

The system has to cope with three different memory sizes available for OSD depending on the configuration (mode of operation):

Configuration 1: Video displayed

When moving pictures are displayed, the desirable RAM minimum size available for OSD should allow to store 262144 pixels in CLUT4 (Colour Lock-Up Table where 1 pixel=4 bits) mode, which requires 131072 bytes memory space.

Configuration 2: Still pictures displayed

When still pictures are displayed, the RAM size available for OSD can be extended to 996148 pixels in CLUT4 mode, which requires 4498047 bytes memory space.

Configuration 3: no video nor still pictures

When no moving pictures and still pictures are displayed, all video RAM should preferably become available for OSD, which represents 1.9 MB memory space approximately.

The CPU RAM 10 has a 2 MB (Mega Bytes) capacity. The Software occupies 1.25 MB in CPU RAM 10, until the scheduler has started. 750 KB are then left available for the system and the OSD buffer pools. A 150 KB system pool is sufficient to insure a robust and efficient functioning of the software. It then remains around 600 KB in CPU RAM 10 for the OSD pool. When video is running (configuration 1), 112 KB of free memory space are available in Video RAM 8. Configuration 2 leaves 457 KB of available memory in Video RAM 8, whereas when no video and still pictures are running (configuration 3), almost the entire Video RAM 8 becomes available, which represents around 1.9 MB. In configuration 1 and 2, the 600 KB available memory in CPU RAM 10 are sufficient to cover the preferable OSD sizes stated above.

Configuration 3 demands 1.9 MB of memory, which is more than the 600 KB available in RAM CPU 10. In configuration 3, RAM CPU 10 contains both the buffers displayed in the buffers currently used in RAM CPU, which represents 2*207360=414720 bytes (2 full screen buffers in CLUT4 mode, one displayed, one being used). The other buffers are stored in RAM Video 8. When a buffer is no more displayed or used, it is flushed to Video RAM 8 via a DMA transfer. When a buffer stored in Video RAM 8 has to be displayed or comes in use, it is loaded in the CPU RAM by a DMA transfer. With this mechanism, the Video RAM 8 plays the role of a cache memory for the CPU RAM 10.

4 different states have thus been defined depending on the OSD configuration:

State 1: Video (Video running)
State 2: Still (still picture running)
State 3: OSD RAM CPU (Only OSD running within the limits of 622080 bytes allocated)
State 4: OSD RAM Video (Only OSD running with more than 622080 bytes allocated)

States 1, 2, and 3 correspond to the normal memory mapping, where all the OSD buffers are located in CPU RAM. State 4 correspond to the memory mapping where all the Video RAM is available for OSD buffers.

States 1, 2 and 3 are managed the same way by the driver of the OSD circuit 12, since all OSD buffers allocated will be placed in RAM CPU 10. Direct transitions between state 1, 2 and state 4 can't happen, because in state 4, the Video RAM is used for the OSD and isn't available for still pictures or video. A transition to state 3 is compulsory before going to state 4. Therefore, the only time the OSD driver has to deal with Video RAM 8 concerns the transitions between state 3 and state 4.

Transition from state 3 to state 4 happens when the application asks the driver to create a new display by calling an OSD_credisplay function and when the total size allocated in CPU RAM 10 for the OSD displays (after the OSD_credisplay call) overflows the 622080 bytes available in CPU RAM 10. In this case, Video RAM 8 shall be activated. A pool of 1.9 MB shall then be created in Video RAM, all the OSD buffers stored in CPU RAM shall be transferred in RAM Video, the display descriptors updated accordingly, and the buffers displayed and the working buffer shall stay in CPU RAM.

Transition to state 4 to state 3 happens when the application asks the driver to free a display by calling a OSD_free_display function and when the total size allocated for the OSD displays (after the OSD_free_display call) becomes inferior to 498074 bytes (corresponding to the size needed in still picture mode). In this case, Video RAM 8 shall be deactivated and shall not be used anymore by the OSD driver. All the OSD buffers in Video RAM 8 shall then be transferred in CPU RAM 10, the display descriptor updated accordingly, and the pool in Video RAM 8 shall be deleted.

When in state 4, the Video RAM 8 is used as a cache for the OSD. The management of OSD regions and buffers use the same structures as the one already in use. The only difference is that the buffer address stored in the OSD buffer control blocks in CPU RAM 10 correspond to Video Ram 8 address in state 4, whereas they correspond to CPU RAM address in state 1, 2 and 3. To help management of the Video RAM 8 as cache, an internal array of structure is used, which contains the buffer ID, the address in CPI RAM 10, the address in Video RAM 8, the size and a pointer to the buffer descriptor for each o the 16 display buffers and the buffers currently drawn.

Before drawing of displaying an OSD buffer placed in Video RAM 8, the driver will first have to transfer it from Video RAM 8 to CPU RAM 10. When a displayed buffer or the currently drawn buffer isn't used anymore and is replaced by another one, the driver has to flush it in Video RAM (i.e. transfer it from CPU RAM 10 to Video RAM 8). In both cases, the array structure will be updated correspondingly.

What is claimed is:

1. A video apparatus with a digital decoder comprising:
   a first memory for storing video data;
   a second memory for storing on-screen display data;
   an on-screen display circuit for generating on-screen display graphics signal from the on-screen display data in the second memory;
   wherein the first memory is adapted to receive on-screen display data that is no longer being displayed from the second memory and to transfer said on-screen display data back to the second memory in response to a request for display of data stored in the first memory.

2. A video apparatus according to claim 1, further comprising a processing unit, the first memory not being directly accessible by the processing unit.

3. A video apparatus according to claim 1, wherein the first memory is a random access memory used for video decompression.

4. A video apparatus according to claim 3, wherein the first memory is made available for storing on-screen display where the first memory is not being used for holding video data.

5. A video apparatus according to claim 1, wherein the digital decoder is connected to a digital front-end.

6. A video apparatus according to claim 1, wherein transfer between the first and second memories is made using a direct memory access.

7. A process for controlling a video apparatus comprising a digital decoder, a first memory, a second memory and an on-screen display circuit for generating an on-screen display signal based on data stored in the second memory, said method comprising the steps of:
   writing on-screen display data to the second memory for access by the on-screen display circuit;
   wherein, the first memory is used for video decompression, further comprising the steps of:
   transferring on-screen display data that is no longer being be displayed to the first memory; and
   upon request, transferring back on-screen display data from the first memory to the second memory.

8. A process according to claim 7, further comprising the steps of:
   issuing a request for the on-screen display circuit to use more than a given size in the second memory,
   realizing a direct memory transfer of on-screen display data from the second memory to the first memory.

9. A process according to claim 8, further comprising the steps of:
   issuing a request for the on-screen display circuit to use on-screen display data in the first memory, and
   transferring said on-screen display data to be used from the first memory to the second memory.

10. A process according to claim 8, wherein the transfer of on-screen display data to the first memory occurs when the first memory is unavailable for video decompression.

* * * * *